United States Patent [19]

Takao et al.

[11] Patent Number: 5,518,782

[45] Date of Patent: May 21, 1996

[54] LIQUID CRYSTAL DEVICE

[75] Inventors: Hideaki Takao, Sagamihara; Masanobu Asaoka; Takeshi Togano, both of Yokohama; Makoto Kojima, Hino, all of Japan

[73] Assignee: Canon Kabushiki Kaisha, Tokyo, Japan

[21] Appl. No.: 165,844

[22] Filed: Dec. 14, 1993

[30] Foreign Application Priority Data

Dec. 14, 1992 [JP] Japan .................................. 4-352911
Dec. 14, 1992 [JP] Japan .................................. 4-352912
Dec. 14, 1992 [JP] Japan .................................. 4-352915

[51] Int. Cl.⁶ .................................................. G02F 1/1337
[52] U.S. Cl. .................................................. 428/1; 359/75
[58] Field of Search .................................. 428/1; 359/75, 359/78

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,759,614 | 7/1988 | Yokohura et al. | 359/75 |
| 4,820,026 | 4/1989 | Okada et al. | 350/341 |
| 4,883,344 | 11/1989 | Okada et al. | 350/339 R |
| 4,995,705 | 2/1991 | Yoshinaga et al. | 350/350 S |
| 5,129,727 | 7/1992 | Hanyu et al. | 359/75 |
| 5,192,596 | 3/1993 | Hanyu et al. | 438/1 |
| 5,268,780 | 12/1993 | Hanyu et al. | 359/75 |

FOREIGN PATENT DOCUMENTS

| | | | |
|---|---|---|---|
| 56-107216 | 8/1981 | Japan . | |
| 1200527 | 9/1986 | Japan | 359/75 |
| 1006923 | 1/1989 | Japan | 359/75 |

Primary Examiner—Alexander S. Thomas
Attorney, Agent, or Firm—Fitzpatrick, Cella, Harper & Scinto

[57] ABSTRACT

A liquid crystal device is constituted by disposing a chiral smectic liquid crystal between a pair of substrates. At least one of the pair of substrates is provided with an alignment film of a nitrogen-containing polymer, such as a polyimide, a polyamide or a polyamideimide, having a main chain including a structural unit represented by the following formula (I):

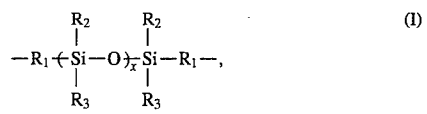

wherein $R_1$ denotes a divalent aliphatic or aromatic group, and $R_2$ and $R_3$ independently denote a monovalent aliphatic or aromatic group, and X denotes a positive integer.

10 Claims, 6 Drawing Sheets

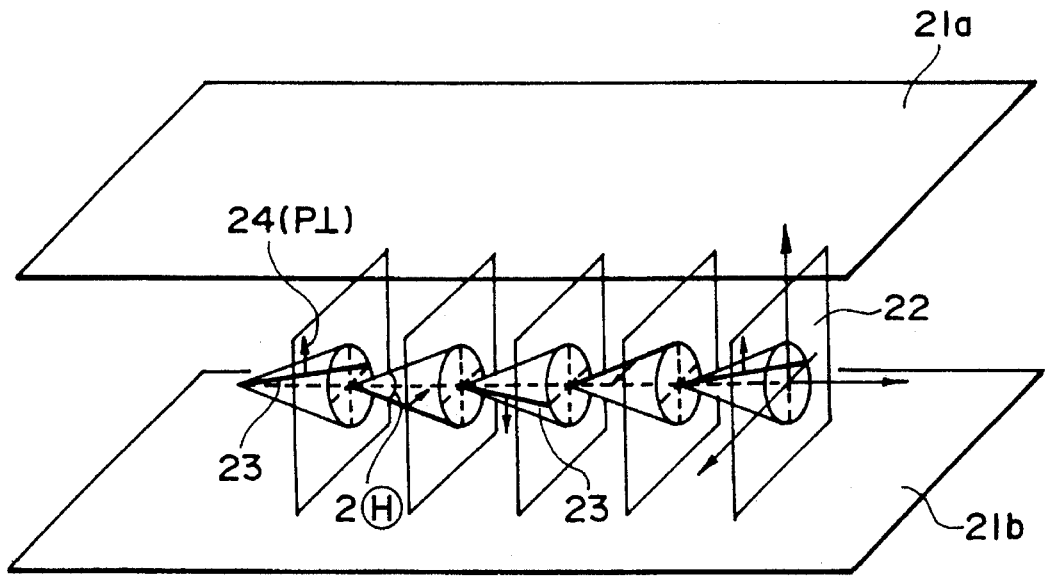
F I G. 2
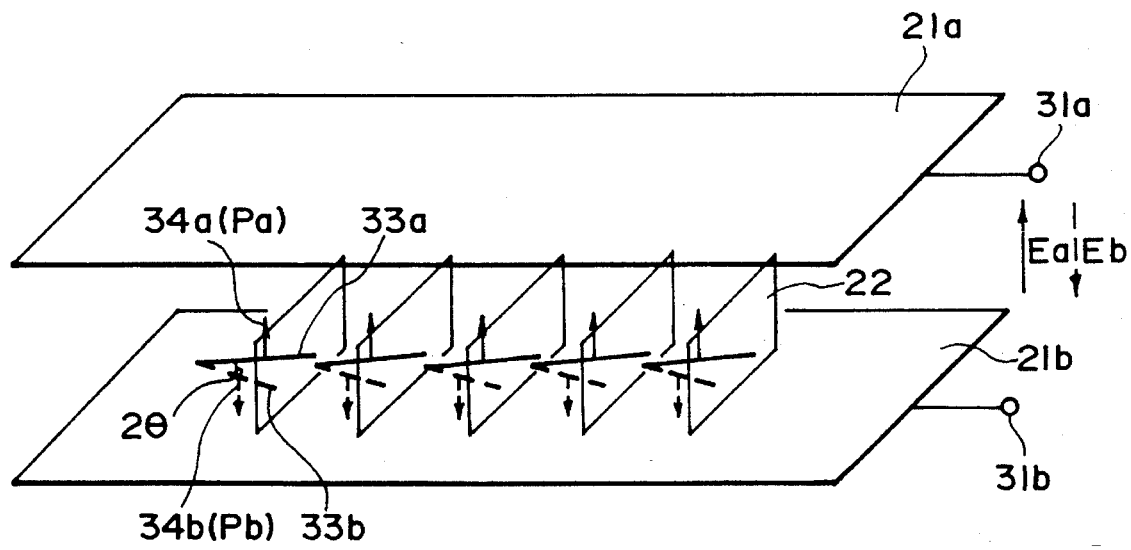
F I G. 3

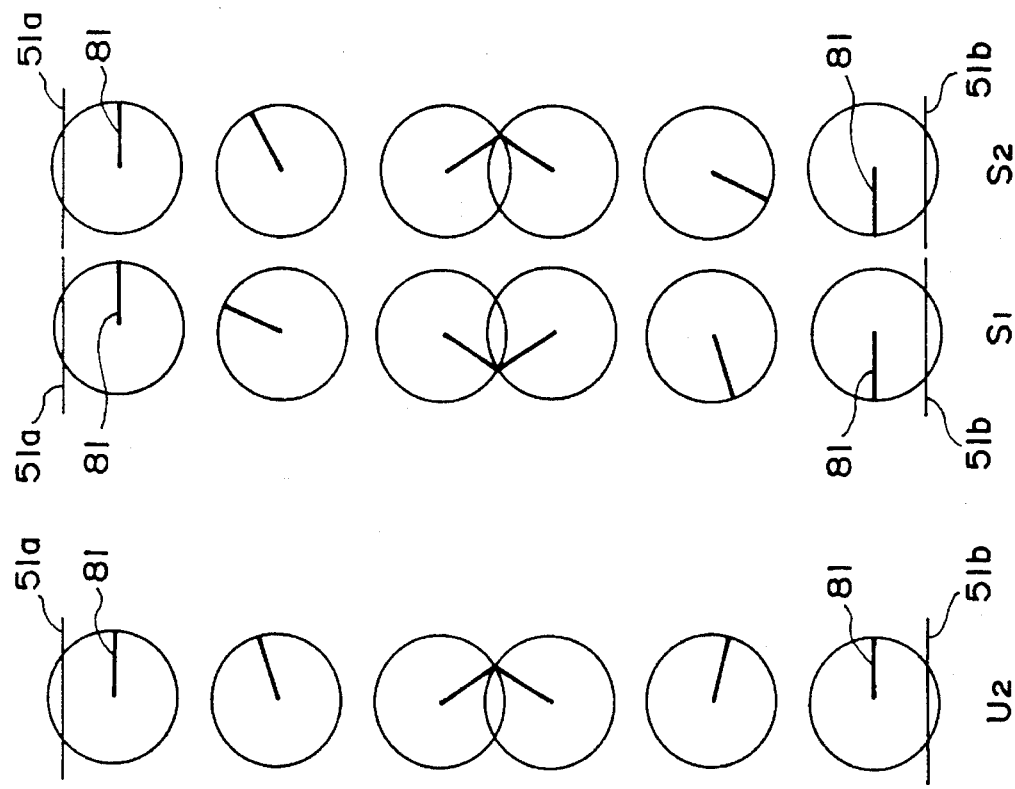
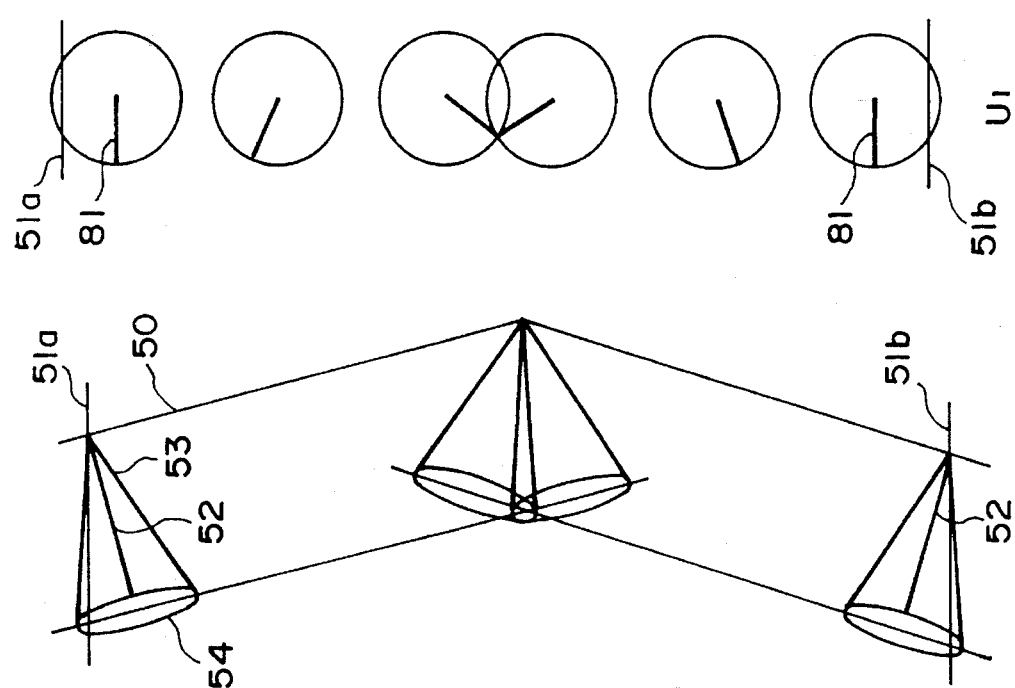
FIG. 6
FIG. 5
FIG. 4

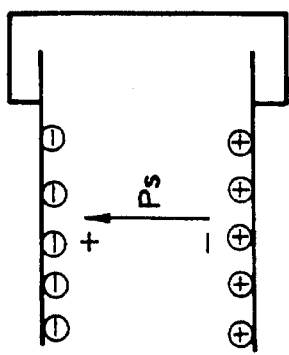
FIG.8(a)
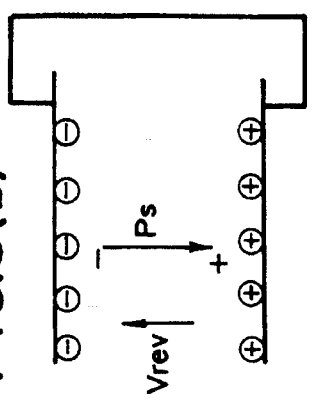
FIG.8(b)
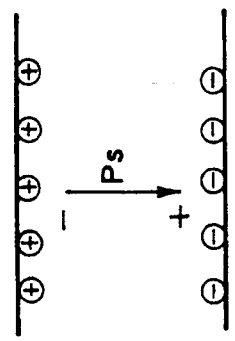
FIG. 8(c)
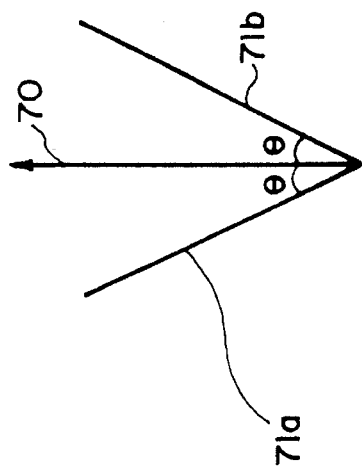
FIG. 7A
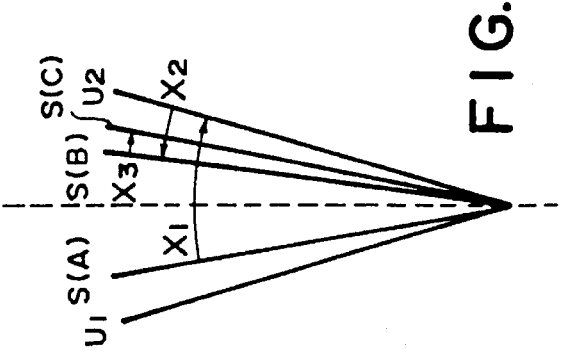
FIG. 9
FIG. 7B

LIQUID CRYSTAL DEVICE

FIELD OF THE INVENTION AND RELATED ART

This invention relates to a liquid crystal device to be used in a liquid crystal display device or a liquid crystal-optical shutter, etc., particularly a liquid crystal device using a ferroelectric liquid crystal, more particularly to a liquid crystal device improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2(\Delta nd/\lambda)\pi,$$

wherein $I_0$: incident light intensity,

I: transmitted light intensity, $\theta$: tilt angle, $\Delta n$: refractive index anisotropy, d: thickness of the liquid crystal layer, $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle Ⓗ (the angle Ⓗ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3–8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. More specifically, it has been found that the tilt angle $\theta$ in a non-helical structure becomes smaller than the tilt angle Ⓗ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle Ⓗ in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142–143.

SUMMARY OF THE INVENTION

Accordingly, an object of the present invention is to provide a liquid crystal device having solved the above-mentioned problems, particularly a liquid crystal device which provides a large tilt angle of a chiral smectic liquid crystal in a non-helical structure and provides a display capable of stably displaying a high-contrast image and yet free from after-image.

According to the present invention, there is provided a liquid crystal device, comprising: a pair of substrates and a chiral smectic liquid crystal disposed between the substrates; at least one of said pair of substrates having thereon an alignment film of a nitrogen-containing polymer having a main chain including a structural unit represented by the following formula (I):

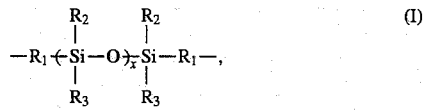

wherein $R_1$ denotes a divalent aliphatic or aromatic group, and $R_2$ and $R_3$ independently denote a monovalent aliphatic or aromatic group, and X denotes a positive integer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a perspective view showing schematically an alignment of a chiral smectic liquid crystal having a helical structure.

FIG. 3 is a perspective view showing schematically an alignment state of a chiral smectic liquid crystal having a non-helical structure.

FIG. 4 is a schematic sectional view showing an alignment state of a chiral smectic liquid crystal aligned according to the present invention.

FIG. 5 is an illustration of C-director alignments in a uniform alignment state.

FIG. 6 is an illustration of C-director alignments in a splay alignment state.

FIGS. 7A and 7B are plan views illustrating tilt angles θ in a uniform alignment state and a splay alignment state, respectively.

FIG. 8(a) to 8(c) are section views showing a charge distribution, a direction of a spontaneous polarization $P_S$ and a direction of a reverse electric field Vrev.

FIG. 9 is a schematic plan view illustrating changes in tilt angle θ during and after application of an electric field.

DETAILED DESCRIPTION OF THE INVENTION

Figure 1:
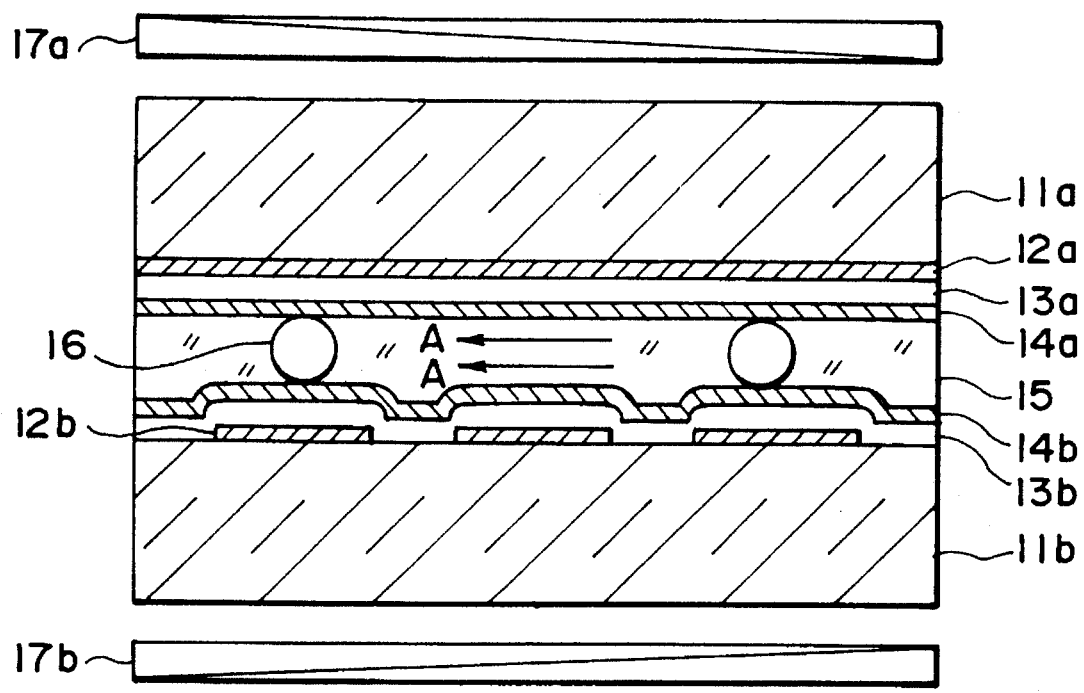
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200–1000 Å-thick insulating films 13a of $SiO_2$, $TiO_2$, $Ta_2O_5$, etc., and 50–1000 Å-thick alignment control films 14a and 14b.

In this instance, the alignment control films 14a and 14b have been treated by rubbing, as a uniaxial aligning treatment, in directions which are parallel to each other and in the same direction (indicated by arrows A in FIG. 1). A chiral smectic liquid crystal 15 is disposed between the substrates 11a and 11b, and the spacing between the substrates 11a and 11b is set to provide the liquid crystal layer 15 with a thickness (e.g., 0.1–3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state. The thus formed cell structure is sandwiched between a pair of polarizers 17a and 17b arranged in cross nicols.

In the present invention, it is also possible to dispose the rubbing directions provided to a pair of substrates to be parallel and opposite to each other or crossing each other at an intersection angle of 2–30 degrees.

The nitrogen-containing polymer used for constituting the alignment film according to the present invention may include a polyimide, a polyamide, and a polyamideimide.

If a preferred embodiment of the present invention, the structural unit of the above-mentioned formula (I) is disposed as recurring unit within the main chain of a polyimide, a polyamide or a polyamideimide.

Such a polyimide may be obtained by subjecting a diamine compound providing the structural unit of the formula (I) and a tetracarboxylic acid to polycondensation to form a polyamide acid and subjecting the polyamide acid to cyclization under heating.

Preferred examples of the tetracarboxylic acid anhydride may include those having a linear molecular structure forced by planar rigidity thereof, such as tetracarboxylic anhydrides having a skeleton as shown below:

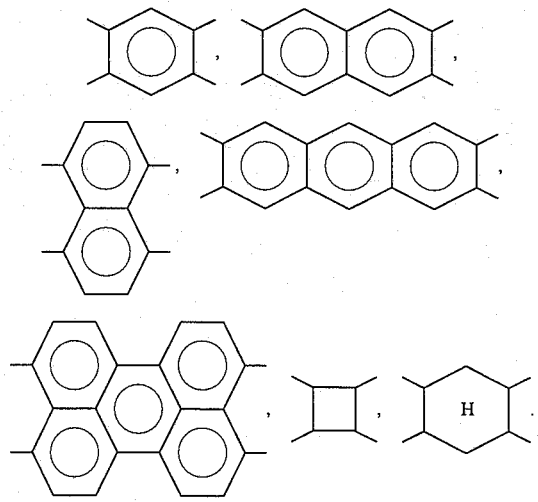

It is also possible to use a tetracarboxylic acid having a non-linear (flexible) molecular structure, examples of which may include tetracarboxylic anhydrides having a skeleton as shown below:

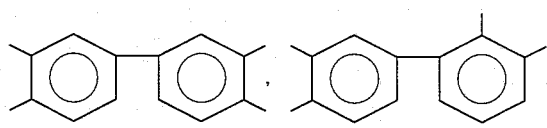

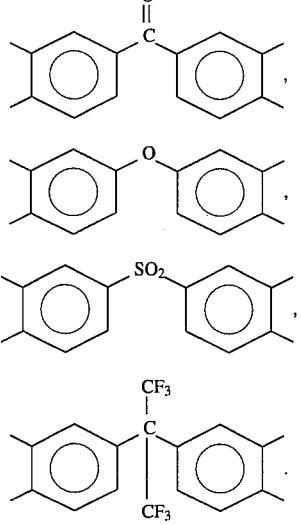

The polyamide may be obtained by subjecting a diamine compound providing the structural unit of the formula (I) and a dicarboxylic acid to polycondensation.

Preferred examples of the dicarboxylic acid may include those having a linear molecular structure, such as terephthalic acid, 4,4'-biphenyldicarboxylic acid, and 2,6-naphthalenedicarboxylic acid.

It is also possible to use a dicarboxylic acid having a non-linear molecular structure, such as isophthalic acid, orthophthalic acid, 4,4'-dicarboxydiphenylmethane, 4,4'-dicarboxydiphenyl ether, and 2,2-bis(4-carboxyphenyl)hexafluoropropane.

The polyamideimide may be obtained by subjecting a precursor formed by polycondensation between a diamine providing the structural unit of the formula (I) to and a tricarboxylic anhydride cyclization under heating.

Examples of the tricarboxylic anhydride used in the present invention may include those of the following formula:

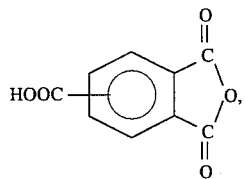

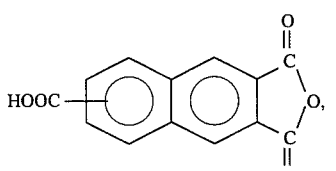

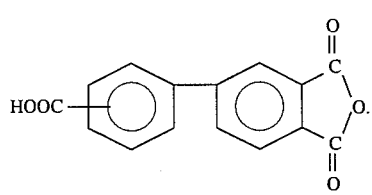

The diamine providing the structural unit of the formula (I) may be represented by the following formula (Ia):

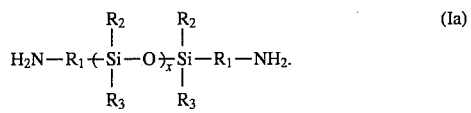

In the formulae (I) and (Ia), $R_1$ denotes a divalent aliphatic group preferably having 1–15 carbon atoms represented by an alkylene group, a cycloalkylene group or an oxyalkylene group, such as: $-CH_2-$, $-CH_2CH_2-$, $-CH_2CH_2CH_2-$,

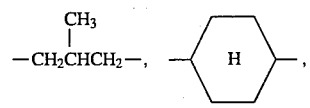

$-CH_2OCH_2-$, or a divalent aromatic group preferably having 6–15 carbon atoms represented by the arylene group, such as

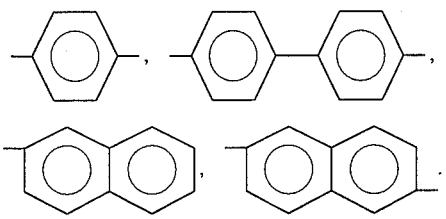

Further, $R_2$ and $R_3$ independently denote a monovalent aliphatic group preferably having 1–15 carbon atoms as represented by an alkyl group or a cycloalkyl group, such as: $-CH_3$, $-C_2H_5$, $-C_3H_7$, $-C_4H_9$,

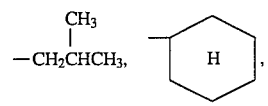

or a monovalent aromatic group preferably having 6–15 carbon atoms represented by an aryl group, such as

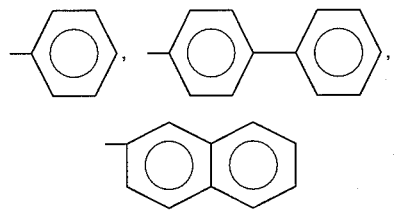

x is a positive integer ($x \leq 1$).

In combination with the diamine of the formula (I), it is also possible to use another diamine, preferred examples of which may include a bis[4-(aminophenoxy)phenyl]alkane compound represented by the following formula (II):

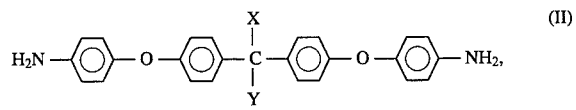

wherein X and Y independently denote $-C_xH_{2x+1}$ or $-(CH_2)_mC_yF_{2y+1}$, wherein $x \geq 1$, $y \geq 1$, and $m \geq 0$.

In the case of co-use of the diamines, it is preferred to use the diamine of the formula (Ia) in an amount of 0.1–100 mols, particularly 1–30 mols, per 1 mol of another diamide, preferably the diamine of the formula (II).

The nitrogen-containing polymer used in the present invention may generally have a number-average molecular weight of $10^4$–$10^6$.

In case of using an alignment film of an ordinary polyimide, it is difficult to align a liquid crystal so as to provide average molecular axes showing a tilt angle which is close to the maximum tilt angle as will be described hereinafter. According to the present invention, however, it has become possible to obtain a large tilt angle by using an alignment film of a nitrogen-containing polymer having a structural unit of the above-mentioned formula (I).

Further, by using a precursor having the structured unit of the formula (I) in its main chain, it has become possible to bake the precursor for imidation at a lower temperature than usual.

As described, the polyimide according to the present invention is characterized by having a structural unit of the above-mentioned formula (I). It is further preferred that the polyimide comprises at least two species including at least one species obtained from a tetracarboxylic anhydride having a linear molecular structure.

Such at least two species of polyimides may be composited by blending (of precursor polyamide acids), copolymerization (for providing co-polyamide acid) or lamination of polyimides. Copolymerization is preferred.

An alignment film of the polyimide may be formed on a substrate by forming a solution of the corresponding polyamide acid as a polyimide precursor in a solvent, such as dimethylformamide, dimethylacetoamide, dimethylsulfoxide and N-methylpyrrolidone at a concentration of 0.01–40 wt. % and applying the solution onto the substrate by spinner coating, spray coating, roller coating, etc., followed by heating at 100°–350 °C., preferably 200°–300° C., for imidation. The polyimide alignment film thus formed may be rubbed with a cloth, etc., in one direction. In case where a pair of substrates are both provided with alignment films, the alignment films on both substrates may be rubbed in directions which are parallel and identical or opposite to each other or cross each other at an angle of 2–30 degrees.

The polyimide alignment film may be formed in a thickness of 30 Å–1 μm, preferably 200 Å–2000 Å. In this case, the insulating films 13a and 13b shown in FIG. 1 can be omitted. In case where the alignment film 14a or 14b is formed on the insulating film 13a or 13b, the alignment film may be formed in a thickness of 500 Å or less, preferably 300 Å or less.

It is also preferred that the polyamide comprises at least two species including at least one species obtained from a carboxylic acid having a linear molecular structure.

Such at least two species of polyamides may be composited by blending, copolymerization for providing co-polyamides, or lamination of polyamides. Copolymerization is preferred.

An alignment film of the polyamide may be formed on a substrate by forming a solution of the polymer components including a polyamide in a solvent, such as dimethylformamide, dimethylacetoamide, dimethylsulfoxide and N-methylpyrrolidone at a concentration of 0.01–40 wt. % and applying the solution onto the substrate by spinner coating, spray coating, roller coating, etc., followed by heating at 100°–250° C., preferably 150°–220 °C., for evaporation of the solvent. The polyamide alignment film thus formed may be rubbed with a cloth, etc., in one direction similarly as the polyimide alignment film. The polyamide alignment film may be formed in a thickness of 30 Å–1 μm, preferably 200 Å–2000 Å. In this case, the insulating films 13a and 13b shown in FIG. 1 can be omitted. In case where the alignment film 14a or 14b is formed on the insulating film 13a or 13b, the alignment film may be formed in a thickness of 200 Å or less, preferably 100 Å or less.

In the present invention, it is also possible to form an alignment film of a specific polyamideimide having a structural unit of the formula (I) for obtaining further better characteristic. The polyamideimide partially having an amide structure can be formed by baking for imidation at a lower temperature than a polyimide. This is advantageous in production.

It is also possible to use a composite polyamideimide including at least two species by blending, copolymerization or lamination.

An alignment film of the polyamideimide may be formed on a substrate by forming a solution of the corresponding polyamide acid as a precursor in a solvent, such as dimethylformamide, dimethylacetoamide, dimethylsulfoxide and N-methylpyrrolidone at a concentration of 0.01–40 wt. and applying the solution onto the substrate by spinner coating, spray coating, roller coating, etc., followed by heating at 100°–350° C., preferably 150°–300° C., for imidation. The polyamideimide alignment film thus formed may be rubbed with a cloth, etc., in one direction similarly as the polyimide alignment film.

The polyamideimide alignment film may be formed in a thickness of 30 Å–1 μm, preferably 200 Å–2000 Å. In this case, the insulating films 13a and 13b shown in FIG. 1 can be omitted. In case where the alignment film 14a or 14b is formed on the insulating film 13a or 13b, the alignment film may be formed in a thickness of 500 Å or less, preferably 300 Å or less.

The liquid crystal material 15 used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 micron or longer in cholesteric phase (measured at a mid temperature in the cholesteric range) is preferred. Preferred examples of such a liquid crystal material may include liquid crystal materials (1)–(5) below comprising the following liquid crystals [A], [B] and [C] in the indicated proportions by weight.

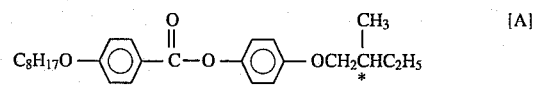

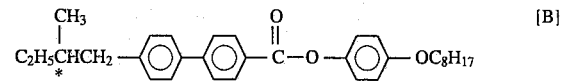

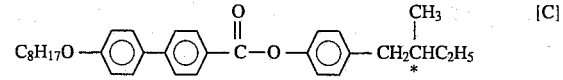

Liquid crystal material (1) $[A]_{90}/[B]_{10}$ (2) $[A]_{80}/[B]_{20}$ (3) $[A]_{70}/[B]_{30}$ (4) $[A]_{60}/[B]_{40}$ (5) [C]

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apex angle of a helical cone in this state is a tilt angle ⓗ in chiral smectic phase of such a helical structure. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4 is a schematic sectional view showing an alignment state of liquid crystal molecules attained by the present invention, and FIG. 5 is a view showing alignment of corresponding C-directors.

Reference numerals 51a and 51b in FIG. 4 denote upper and lower substrates, respectively. Numeral 50 denotes a molecular layer composed of liquid crystal molecules 52, and liquid crystal molecules 52 are aligned so as to change their positions along the bottom face 54 (circular) of a cone 54. FIG. 5 more specifically shows a change in C-directors. Referring to FIG. 5, at $U_1$ are shown C-directors 81 (each being a projection of a molecular long axis onto an imaginary plane perpendicular to the normal to a molecular layer 50) in one stable orientation state, and at $U_2$ are shown C-directors 81 in the other stable orientation state.

On the other hand, an alignment state attained by a conventional rubbing-treated polyimide film may be represented by a C-director diagram of FIG. 6, which shows an alignment state wherein molecular axes are twisted in a large degree from the upper substrate 51a to the lower substrate 51b to provide a smaller tilt angle θ.

FIG. 7A is a schematic plan view illustrating a tilt angle θ in an alignment state where C-directors 81 assume a state shown in FIG. 5 (referred to as "uniform alignment state"), and FIG. 7B is a schematic plan view illustrating a tilt angle θ in an alignment state where C-directors 81 assume a state shown in FIG. 6 (referred to as "splay alignment state"). In these figures, reference numeral 70 denotes a rubbing axis provided to the above-mentioned fluorine-containing polyimide film, numeral 71a denotes an average molecular axis in the orientation state $U_1$, numeral 71b. denotes an average molecular axis in the orientation state $U_2$, numeral 72a denotes an average molecular axis in the orientation state $S_1$, and numeral 72b denotes an average molecular axis in the orientation state $S_2$. The average molecular axes 71a and 71b can be switched to each other by applying voltages of mutually opposite polarities. Similar switching is caused between the average molecular axes 72a and 72b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$Vrev=2P_S/(Ci+C_{LC})$$

FIG. 8 is a schematic sectional view illustrating changes in charge distribution direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by an arrow shown at FIG. 8(b). The reverse electric field Vrev disappears in a short time to provide a distribution of ⊕ and ⊖ charges as shown at FIG. 8(c).

Figure 10:
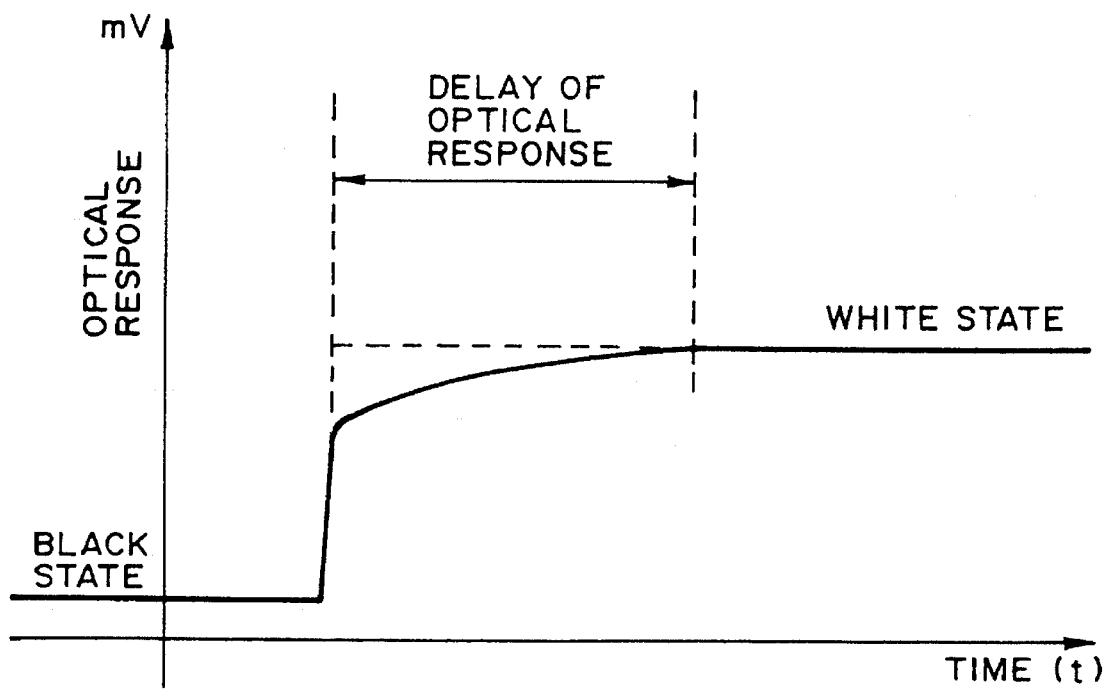
FIGS. 10 and 11 are graphs showing optical response characteristics according to a conventional device and the present invention, respectively.

FIG. 9 is a plan view showing a change in optical response in a splay alignment state given by a conventional polyimide alignment film in terms of a change in tilt angle θ. Referring to FIG. 9, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle ⊕ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle θ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle θ. The resultant optical response in this case is shown in FIG. 10.

Figure 11:
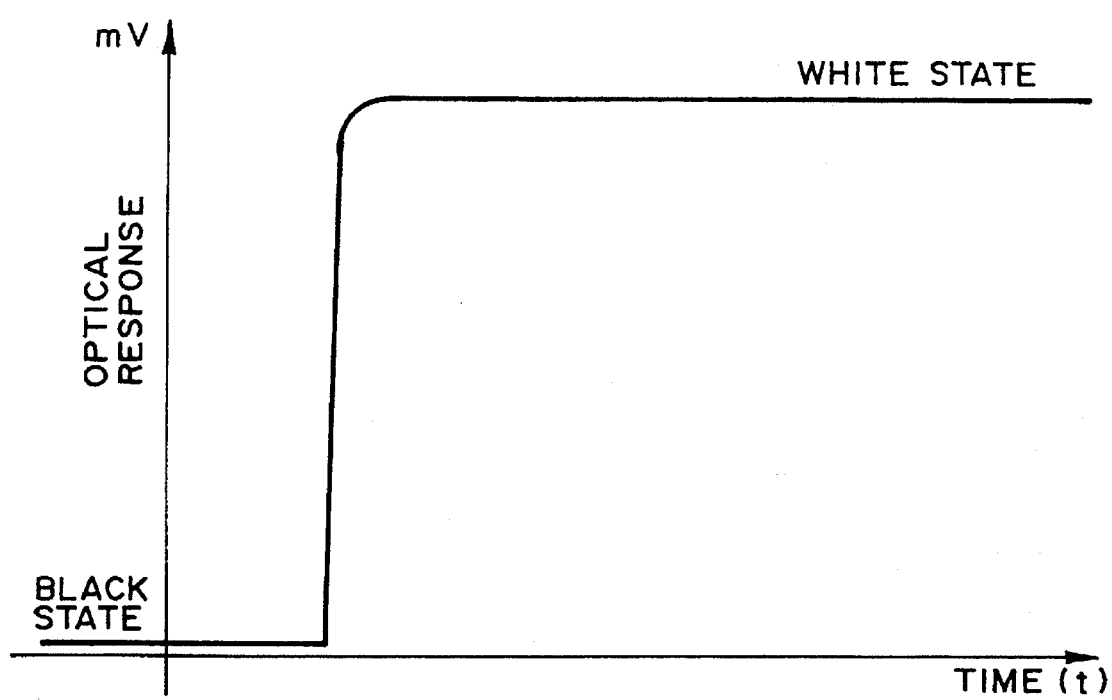

In the alignment state given by using the above-mentioned nitrogen-containing polymer of the specific structure of the present invention, the average molecular axes S(A), S(B) and S(C) in the splay alignment state shown in FIG. 9 are not caused but it is possible to form an alignment state with an average molecular axis giving a tilt angle θ which is close to a maximum tilt angle Ⓗ. An optical response at this time according to the present invention is shown in FIG. 11. FIG. 11 shows that a delay in optical response causing after-image is obviated and a high contrast in memory states is caused.

Hereinbelow, the present invention will be explained based on Examples.

Example 1

Two 1.1 mm-thick glass plates each provided with a 1000 Å-thick ITO film were respectively coated with a 3.0 wt. % solution in a solvent mixture of N-methylpyrrolidone/n-butylcellosolve (=5/1) of a polyamide acid as a precursor of a polyimide having a structure represented by the following formula (III):

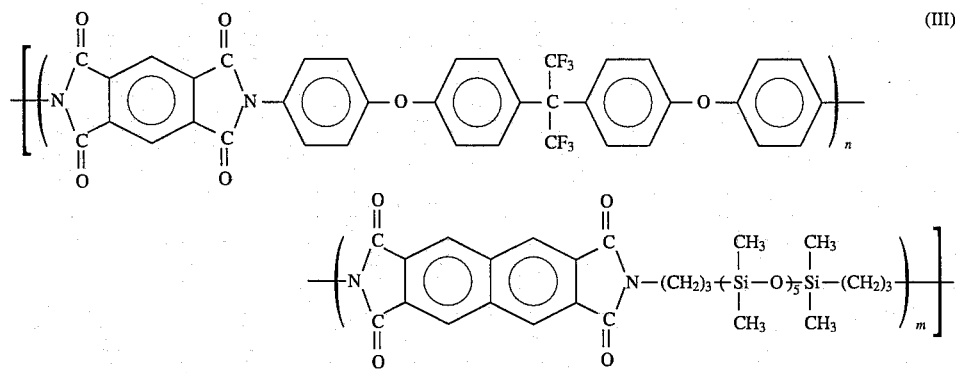

(n:m=1:8–10, Mn (number-average molecular weight)=at least $10^5$)

After the coating, the coating films were baked at 270° C. for about 1 hour to form 250 Å-thick films, which were then rubbed with a nylon-planted cloth in one direction.

On one of the two glass plates thus treated, 1.5 μm-dia. alumina beads were dispersed, and the other glass plate was superposed thereon so that their rubbing axes were parallel to each other and disposed in the same direction to form a blank cell (panel).

The blank cell was filled with a ferroelectric smectic liquid crystal ("CS-1014" (trade name), available from Chisso K.K.) under vacuum and, after sealing, was gradually cooled from isotropic phase at a rate of 5° C./hr. to 30° C., whereby an alignment was effected. The "CS-1014" liquid crystal in the cell showed the following phase transition series.

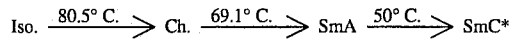

Iso.: isotropic phase,
Ch.: cholesteric phase,
SmA: smectic A phase,
SmC*: chiral smectic C phase.

The above-prepared liquid crystal cell was sandwiched between a pair of 90 degrees-cross nicol polarizers to provide a liquid crystal device and was supplied with a pulse of 50 sec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=about 15 degrees, transmittance in the brightest state=30%, transmittance in the darkest state=1%, contrast ratio=30:1. The delay in optical response causing after-image was at most 0.2 sec.

Figure 12:
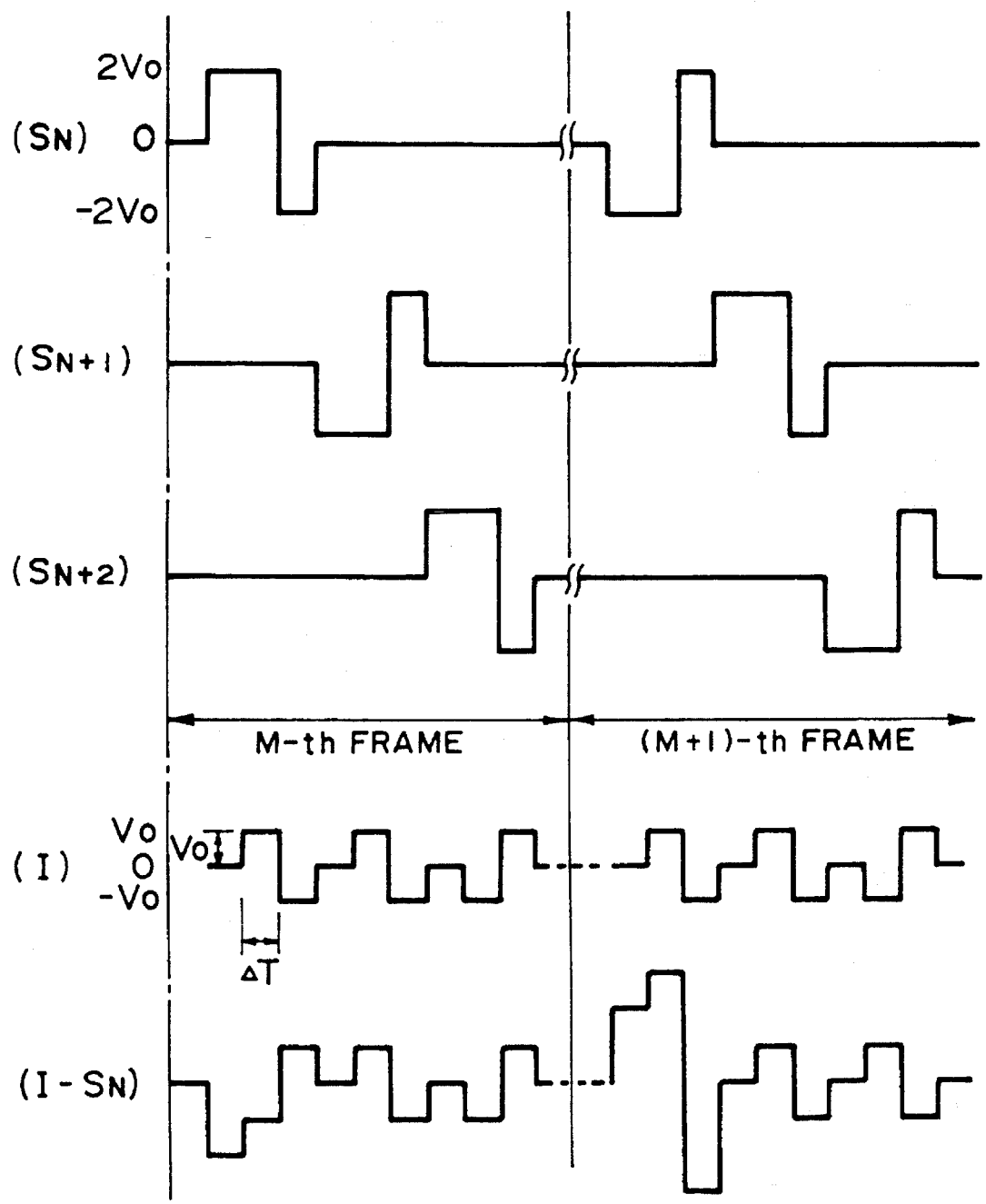
FIG. 12 is a waveform diagram illustrating driving waveforms used in an embodiment of the present invention.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $SN_{N+1}$ and $SN_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5–8 volts and ΔT=20–70 μsec.

Example 2

A liquid crystal cell was prepared in the same manner as in Example 1 except that the baking for alignment film formation was performed at 180° C. for about 1 hour. As a result of evaluation in the same manner as in Example 1, the cell showed similar results as in Example 1.

Example 3

A liquid crystal cell was prepared in the same manner as in Example 1 except that alignment films of a polyimide represented by the following formula (IV) were formed.

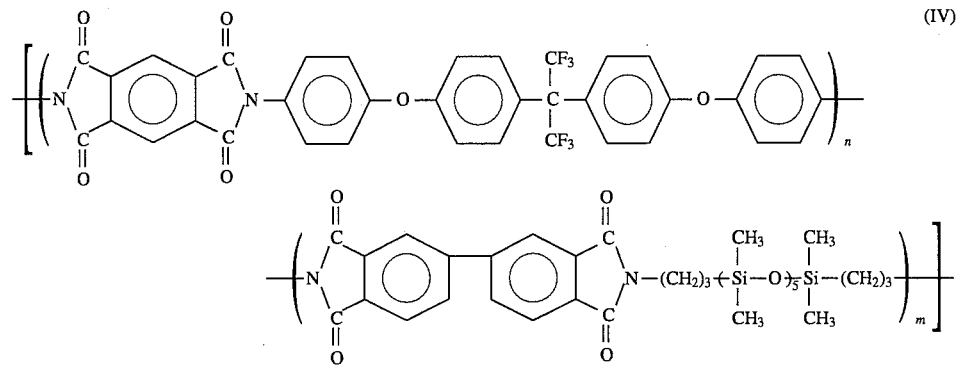

(n:m=1.8–10, Mn=at least $10^5$)

As a result of the same test as in Example 1, the cell showed a contrast ratio of 32:1 and a delay time in optical response of 0.2 sec.

As a result of the multiplexing drive in the same manner as in Example 1, similarly good results as in Example 1 were obtained with respect to both contrast and after-image.

Example 4

A liquid crystal cell was prepared in the same manner as in Example 1 except that alignment films of a polyimide represented by the following formula (V) were formed.

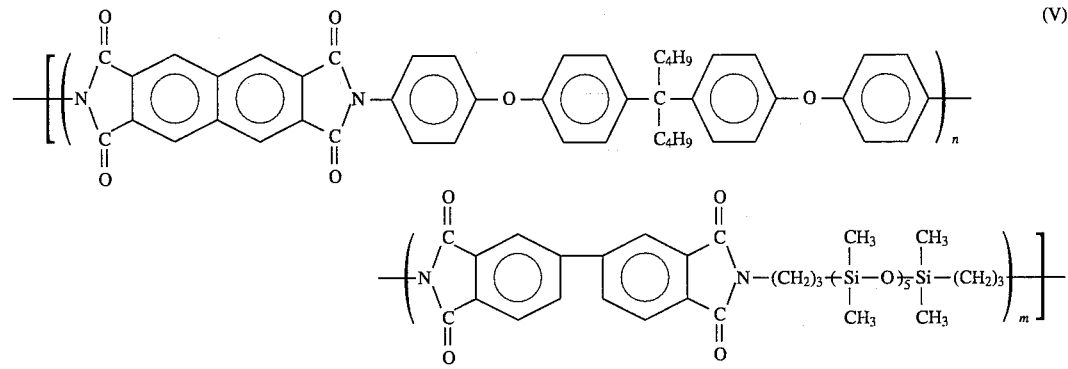

(n:m=1:8–10, Mn=at least $10^5$)

As a result of the same test as in Example 1, the cell showed a contrast ratio of 33:1 and a delay time in optical response of 0.1 sec.

As a result of the multiplexing drive in the same manner as in Example 1, similarly good results as in Example 1 were obtained with respect to both contrast and after-image.

Comparative Example 1

A liquid crystal cell was prepared in the same manner as in Example 1 except that alignment films of a polyimide represented by the following formula (VI) were formed.

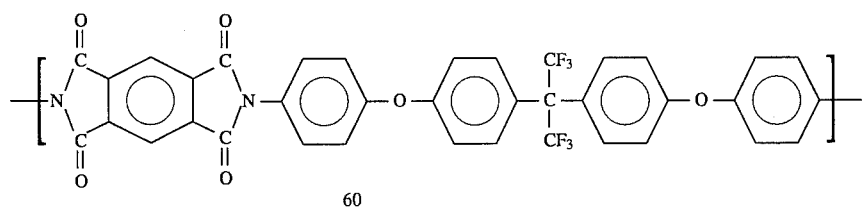

(Mn=at least $10^5$)

As a result of the same test as in Example 1, the cell showed a contrast ratio of 17:1 and a delay time in optical response of 0.8 sec.

As a result of the multiplexing drive in the same manner as in Example 1, the resultant contrast was lower than in Example 1 and after-image was observed.

Example 5

Two 1.1 mm-thick glass plates each provided with a 1000 Å-thick ITO film were respectively coated with a 3.0 wt. % solution in a solvent mixture of N-methylpyrrolidone/n-butylcellosolve (=5/1) of a silicone-modified polyamide having a structure represented by the following formula (VII):

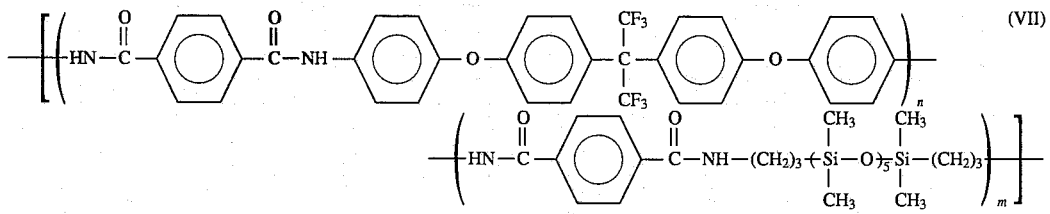

$(n:m=1:10-13, Mn=\text{at least } 10^5)$

After the coating, the coating films were baked at 200° C. for about 1 hour to form 300 Å-thick films, which were then rubbed with a nylon-planted cloth in one direction.

On one of the two glass plates thus treated, 1.5 μm-dia. alumina beads were dispersed, and the other glass plate was superposed thereon so that their rubbing axes were parallel to each other and disposed in the same direction to form a blank cell (panel).

The blank cell was filled with a ferroelectric smectic liquid crystal ("CS-1014" (trade name), available from Chisso K.K.) under vacuum and, after sealing, was gradually cooled from isotropic phase at a rate of 5° C./hr. to 30° C., whereby an alignment was effected.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=about 15 degrees, transmittance in the brightest state=28%, transmittance in the darkest state=1%, contrast ratio=28:1. The delay in optical response causing after-image was at most 0.2 sec.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5–8 volts and $\Delta T$=20–70 μsec.

Example 6

A liquid crystal cell was prepared in the same manner as in Example 5 except that alignment films of a polyamide represented by the following formula (VIII) were formed.

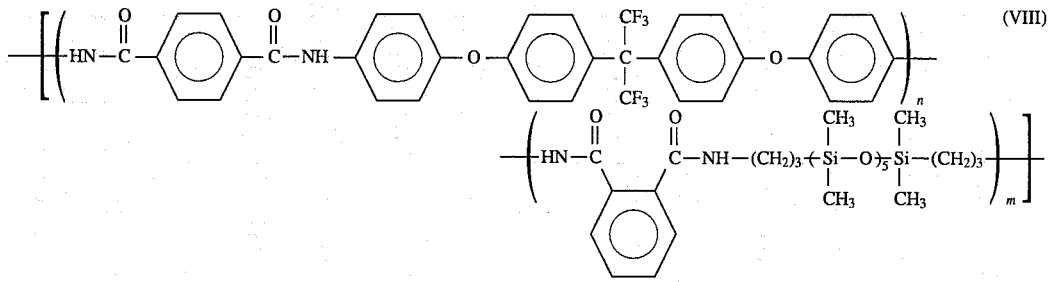

$(n:m=1:10-13, Mn=\text{at least } 10^5)$

As a result of the same test as in Example 5, the cell showed a contrast ratio of 30:1 and a delay time in optical response of 0.2 sec.

As a result of the multiplexing drive in the same manner as in Example 5, similarly good results as in Example 5 were obtained with respect to both contrast and after-image.

Comparative Example 2

A liquid crystal cell was prepared in the same manner as in Example 5 except that alignment films of a polyamide represented by the following formula (IX) were formed.

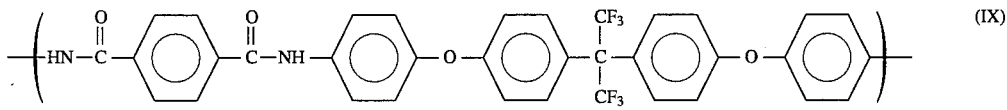

(Mn=at least $10^5$)

As a result of the same test as in Example 5, the cell showed a contrast ratio of 15:1 and a delay time in optical response of 1.5 sec.

As a result of the multiplexing drive in the same manner as in Example 5, the resultant contrast was lower than in Example 5 and after-image was observed.

Comparative Example 3

A liquid crystal cell was prepared in the same manner as in Example 5 except that alignment films of a polyamide represented by the following formula (X) were formed.

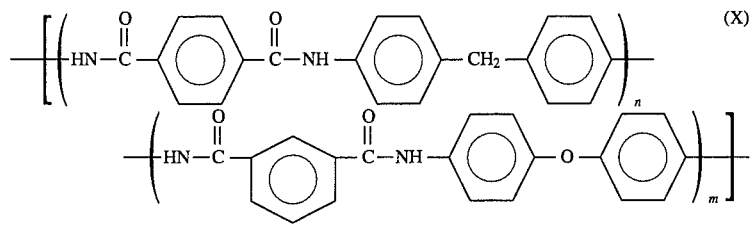

(Mn=at least $10^5$)

As a result of the same test as in Example 5, the cell showed a contrast ratio of 6:1 and a delay time in optical response of 2.2 sec.

As a result of the multiplexing drive in the same manner as in Example 5, the resultant contrast was lower than in Example 5 and after-image was observed.

Example 7

Two 1.1 mm-thick glass plates each in a size of 100 mm ×100 mm and provided with a 1000 Å-thick ITO film were respectively coated with a 3.0 wt. % solution in a solvent mixture of N-methylpyrrolidone/n-butylcellosolve (=5/1) of a mixture including 25 wt. parts of a precursor of a polyamideimide represented by the following structural formula (XI):

After the coating, the coating films were then baked at 250° C. for about 1 hour to form 250 Å-thick films, which were then rubbed with a nylon-planted cloth in one direction.

On one of the two glass plates thus treated, 1.5 μm-dia. alumina beads were dispersed, and the other glass plate was superposed thereon so that their rubbing axes were parallel to each other and disposed in the same direction to form a blank cell (panel).

The blank cell was filled with a ferroelectric smectic liquid crystal ("CS-1014" (trade name), available from Chisso K.K. ) under vacuum and, after sealing, was gradually cooled from isotropic phase at a rate of 5° C./hr. to 30° C., whereby an alignment was effected.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=about 15 degrees, transmittance in the brightest state=25%, transmittance in the darkest state=1%, contrast ratio=25:1. The delay in optical response causing after-image was at most 0.2 sec.

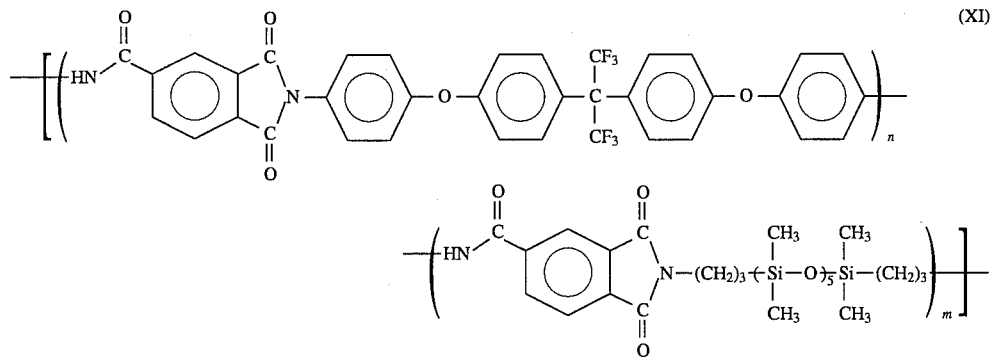

(n:m=1:8–11, Mn=at least $10^5$)

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $SN_{N+1}$ and $SN_{+2}$ are shown voltage waveforms applied to scanning lines, at I is shown a voltage waveform applied to a representative date line, and at ($I-S_N$) is shown a combined voltage waveform applied to the data line I and the scanning line $S_N$. In the above embodiment, the drive was performed under the conditions of $V_0$=5–8 volts and $\Delta T$=20–70 µsec.

Example 8

A liquid crystal cell was prepared in the same manner as in Example 7 except that alignment films of a polyamide-imide represented by the following formula (XII) were formed.

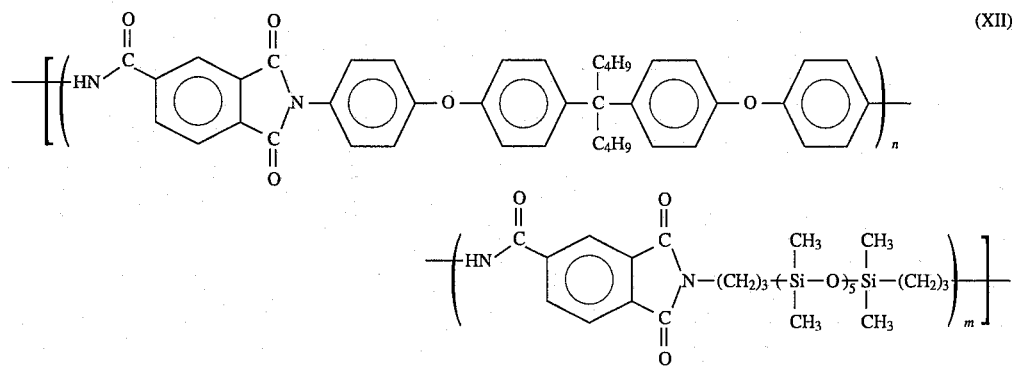

(Mn=at least $10^5$)

As a result of the same test as in Example 7, the cell showed a contrast ratio of 22:1 and a delay time in optical response of 0.3 sec.

As a result of the multiplexing drive in the same manner as in Example 7, similarly good results as in Example 7 were obtained with respect to both contrast and after-image.

Comparative Example 4

A liquid crystal cell was prepared in the same manner as in Example 7 except that alignment films of a polyamide-imide represented by the following formula (XIII) were formed.

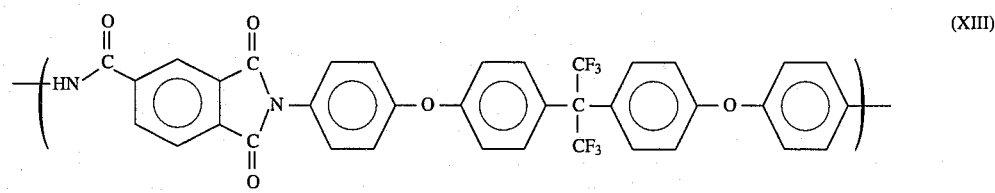

(Mn=at least $10^5$)

As a result of the same test as in Example 7, the cell showed a contrast ratio of 12:1 and a delay time in optical response of 1.0 sec.

As a result of the multiplexing drive in the same manner as in Example 7, the resultant contrast was lower than in Example 7 and after-image was observed.

Comparative Example 5

A liquid crystal cell was prepared in the same manner as in Example 7 except that alignment films of a polyamide-imide represented by the following formula (XIV) were formed.

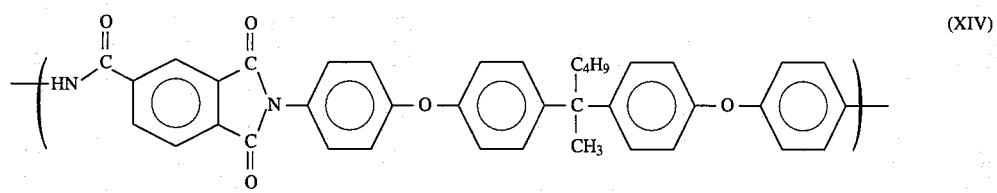

(Mn=at least $10^5$)

As a result of the same test as in Example 7, the cell showed a contrast ratio of 10:1 and a delay time in optical response of 2.0 sec.

As a result of the multiplexing drive in the same manner as in Example 7, the resultant contrast was lower than in Example 7 and after-image was observed.

Comparative Example 6

A liquid crystal cell was prepared in the same manner as in Example 7 except that alignment films of a polyamide-imide represented by the following formula (XV) were formed.

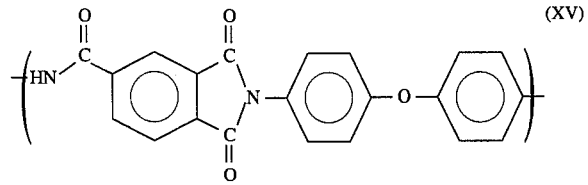

(Mn=at least $10^5$)

As a result of the same test as in Example 7, the cell showed a contrast ratio of 5:1 and a delay time in optical response of 2.8 sec.

As a result of the multiplexing drive in the same manner as in Example 7, the resultant contrast was lower than in Example 7 and after-image was observed.

As described above, according to the present invention, there is provided a liquid crystal device capable of providing a high contrast between the bright and dark states, and particularly a high quality display with a very large display contrast and free from ugly after-image during multiplexing drive.

Further, depending on a chemical structure, it is possible to effect the baking of the alignment film at a lower temperature, thus providing a better productivity and an allowance for selection of materials for other members of the liquid crystal device.

What is claimed is:

1. A liquid crystal device, comprising:

a pair of substrates and a chiral smectic liquid crystal disposed between the substrates, at least one of said pair of substrates having thereon an alignment film comprising a polyimide having a main chain including a first structural unit represented by the following formula (I) and a second structural unit represented by the following formula (II):

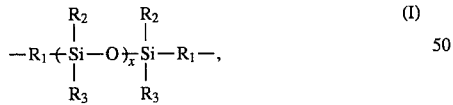

wherein $R_1$ denotes a divalent aliphatic or aromatic group, and $R_2$ and $R_3$ independently denote a monovalent aliphatic or aromatic group, and X denotes a positive integer; and

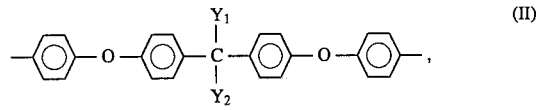

wherein $Y_1$ and $Y_2$ independently denote $-C_lH_{2l+1}$ or $-(CH_2)_mC_nF_{2n+1}$, wherein $l \geq 1$, $n \geq 1$, and $m \geq 0$.

2. A device according to claim 1, wherein said polyimide is a composite of at least two species of polyimides.

3. A device according to claim 1, wherein said polyimide includes at least one species of polyimide having a linear molecular structure in its carboxylic acid-originated moiety.

4. A liquid crystal device, comprising:

a pair of substrates and a chiral smectic liquid crystal disposed between the substrates, at least one of said pair of substrates having thereon an alignment film comprising two species of polyamides, at least one of said polyamides having a main chain including a first structural unit represented by the following formula (I) and a second structural unit represented by the following formula (I):

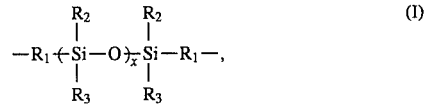

wherein $R_1$ denotes a divalent aliphatic or aromatic group, and $R_2$ and $R_3$ independently denote a monovalent aliphatic or aromatic group, and X denotes a positive integer; and

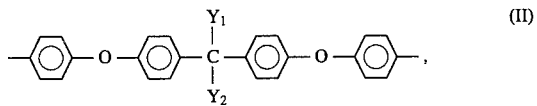

wherein $Y_1$ and $Y_2$ independently denote $-C_lH_{2l+1}$ or $-(CH_2)_mC_nF_{2n+1}$, wherein $l \geq 1$, $n \geq 1$, and $m \geq 0$.

5. A device according to claim 4, wherein said polyamide includes at least one species of polyamide having a linear molecular structure in its carboxylic acid-originated moiety.

6. A liquid crystal device, comprising: a pair of substrates and a chiral smectic liquid crystal disposed between the substrates; at least one of said pair of substrates having thereon an alignment film of a polyamideimide having a main chain including a structural unit represented by the following formula

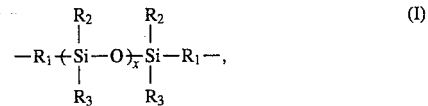

wherein $R_1$ denotes a divalent aliphatic or aromatic group, and $R_2$ and $R_3$ independently denote a monovalent aliphatic or aromatic group, and X denotes a positive integer.

7. A liquid crystal device, comprising:

a pair of substrates and a chiral smectic liquid crystal disposed between the substrates, at least one of said pair of substrates having thereon an alignment film comprising a polyimide having a main chain including a structural unit represented by the following formula (I):

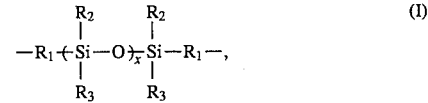

wherein $R_1$ denotes a divalent aliphatic or aromatic group, and $R_2$ and $R_3$ independently denote a monovalent aliphatic or aromatic group, and X denotes a positive integer, wherein said polyimide is a composite of at least two species of polyimides.

8. A device according to claim 7, wherein said polyimide includes at least one species of polyimide having a linear molecular structure in its carboxylic acid-originated moiety.

9. A liquid crystal device, comprising:

a pair of substrates and a chiral smectic liquid crystal disposed between the substrates, at least one of said pair of substrates having thereon an alignment film comprising a polyamide having a main chain including a structural unit represented by the following formula (I):

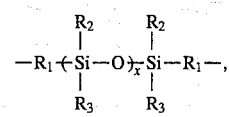

wherein $R_1$ denotes a divalent aliphatic or aromatic group, and $R_2$ and $R_3$ independently denote a monovalent aliphatic or aromatic group, and X denotes a positive integer, wherein said polyamide is a composite of at least two species of polyamides.

10. A device according to claim 9, wherein said polyamide includes at least one species of polyamide having a linear molecular structure in its carboxylic acid-originated moiety.

* * * * *

UNITED STATES PATENT AND TRADEMARK OFFICE
CERTIFICATE OF CORRECTION

PATENT NO. : 5,518,782
DATED : May 21, 1996
INVENTOR(S) : HIDEAKI TAKAO ET AL.

Page 1 of 4

It is certified that error appears in the above-indentified patent and that said Letters Patent is hereby corrected as shown below:

TITLE PAGE, ITEM

[56] REFERENCES CITED

Foreign Patent Documents, "1200527 9/1986 Japan
1006923 1/1989 Japan"

should read

--61-200527 9/1986 Japan
64-6923 1/1989 Japan--

[57] ABSTRACT

Line 10, "X" should read --x--.

COLUMN 3

Line 13, "X" should read --x--.

COLUMN 4

Line 21, "If" should read --In--.

COLUMN 5

Line 39, "to" should be deleted.

UNITED STATES PATENT AND TRADEMARK OFFICE
CERTIFICATE OF CORRECTION

PATENT NO. : 5,518,782
DATED : May 21, 1996
INVENTOR(S) : HIDEAKI TAKAO ET AL.

It is certified that error appears in the above-indentified patent and that said Letters Patent is hereby corrected as shown below:

COLUMN 6

Line 52, "$(x \leq 1)$." should read --$(x \geq 1)$.--

COLUMN 8

Line 17, "0.01-40 wt." should read --0.01-40 wt. %--.

COLUMN 9

Line 6, "Continuously" should read --continuously--.

COLUMN 10

Line 1, "54." should read --53.--; and

Line 65, "⊕" should read --Ⓗ--.

COLUMN 12

Line 50, "date" should read --data--.

COLUMN 16

Line 10, "date" should read --data--.

UNITED STATES PATENT AND TRADEMARK OFFICE
CERTIFICATE OF CORRECTION

PATENT NO. : 5,518,782
DATED : May 21, 1996
INVENTOR(S) : HIDEAKI TAKAO ET AL.

Page 3 of 4

It is certified that error appears in the above-indentified patent and that said Letters Patent is hereby corrected as shown below:

COLUMN 19

Line 3, "$SN_{N+1}$ and $SN_{+2}$" should read --$S_{N+1}$ and $S_{N+2}$--;

Line 5, "date" should read --data--;

Line 20, " 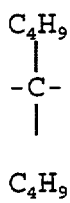 " should read -- 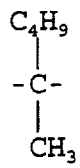 --.

COLUMN 21

Line 55, "X" should read --x--.

COLUMN 22

Line 9, "formula (I):" should read --formula (II):--;

Line 16, "X" should read --x--;

Line 32, "formula" should read --formula (I):--;

Line 40, "X" should read --x--; and

Line 55, "X" should read --x--.

UNITED STATES PATENT AND TRADEMARK OFFICE
CERTIFICATE OF CORRECTION

PATENT NO. : 5,518,782
DATED : May 21, 1996
INVENTOR(S) : HIDEAKI TAKAO ET AL.

Page 4 of 4

It is certified that error appears in the above-indentified patent and that said Letters Patent is hereby corrected as shown below:

<u>COLUMN 23</u>

Line 9, "X" should read --x--.

Signed and Sealed this

First Day of October, 1996

Attest:

BRUCE LEHMAN

*Attesting Officer*     *Commissioner of Patents and Trademarks*